Patented Mar. 27, 1923.

1,450,147

UNITED STATES PATENT OFFICE.

WILHELM ELSNER, OF HANOVER, GERMANY.

PROCESS FOR PURIFICATION OF METHYL ALCOHOL CONTAINING SULPHUROUS IMPURITIES.

No Drawing. Application filed November 15, 1922. Serial No. 601,157.

*To all whom it may concern:*

Be it known that I, WILHELM ELSNER, a citizen of Germany, residing at Hanover, have invented certain new and useful Improvements in Processes for Purification of Methyl Alcohol Containing Sulphurous Impurities; and I do hereby declare the following to be a full, clear, and exact description of the invention, such as will enable others skilled in the art to which it appertains to make and use the same.

In the production of sulphate—or sulphite-cellulose from wood or other cellulose—containing substances, condensates are obtained as by-products which contain appreciable quantities of methyl alcohol. This alcohol usually contains as impurities various organic sulfur compounds. It is well known that from such condensates so-called pure methyl can be produced by purification or rectification. By this purification it is possible to reduce to very small quantities the percentage of sulphur which exists in the raw product in the form of organic sulphur compounds as for instance methyl sulphide and methyl disulphide. Hitherto it has, however, not been possible to completely remove this sulphur. Attempts have been made to eliminate the last traces of sulphur in a technically satisfactory manner by repeated rectification, by treating the alcohol with alkaline solution of acetate of lead, freshly precipitated copper oxide, oxidizing means at ordinary and increased temperature or by treating the vapors with the indicated substances or with a heated copper spiral. These experiments have however not given a satisfactory result as the means proposed act either only upon the inorganic sulphur or attack too strongly the methyl alcohol itself.

The complete removal of the last traces of sulphur is however absolutely necessary for the principal purposes for which methyl alcohol is utilized, namely, for the production of formaldehyde by the so-called contact process. The slightest trace of sulphur has an extremely unfavorable action, for instance upon contact bodies of copper or silver, either causing the reaction to be stopped after a short time or causing undesirable subordinate reactions.

This invention consists in a simple process which permits the separation of the sulphur entirely, or rendering the same ineffective, this process being based upon the action of chlorine upon the sulphurous compounds in question, no quantities worth mentioning of methyl alcohol being attacked, and not even the small quantity of acetone in the methyl alcohol being affected although acetone is very sensitive toward chlorine. It is known from the literature that chlorine acts for instance upon methyl sulphide and disulphide resulting in the formation of oily substitution products. It is further known that by the action of chlorine upon methyl alcohol, as such, formaldehyde, polyoxymethylene, methyl chloride ester and other products are formed. It has now been found that the formation of such compounds can be prevented if chlorine is caused to react with methyl alcohol which has been diluted with water to a predetermined concentration according to the sulphur compound present, for instance 50%, or if concentrated methyl alcohol is mixed with the corresponding quantity of chlorine water at ordinary temperature. After having been allowed to stand for 12 hours the alcoholic solution is distilled in continuously working or in simple rectifying apparatus. A methyl alcohol of extreme purity, free from sulphur and chlorine is thus produced. It is not absolutely necessary to add neutralizing agents before the rectification, as the small quantity of hydrochloric acid which is produced remains behind in the aqueous residue.

The chlorine is used preferably in such a quantity that for one part by weight of the total quantity of sulphur found 7 to 8 parts by weight of chlorine are used. The analysis of the sulphur and chlorine in methyl alcohol is done as follows:—

A small glass constructed like a spirit-lamp of about 50 centimeters volume containing 30 grams of the methyl alcohol to be tested is inserted from below into a cylinder with narrow neck having approximately a height of 50 centimeters and a diameter of 5 centimeters and having lateral tubular sockets. The wick is so adjusted that a flame of approximately 2 centimeters length is produced. The air which has to be conducted through the cylinder during the test is cleaned and dried in two washing bottles mounted in series with the cylinder. A washing bottle arranged behind the cylinder is designed to receive the reagent actually used. The wick is now lighted through one of the lateral tubular sockets which is then immediately connected to the washing bottles with an airtight joint. By means of a water jet pump the quantity of air necessary for the combustion is sucked through the apparatus until the entire quantity of methyl alcohol is burned.

For chlorine analysis the receiver is filled with a solution of silver nitrate weakly acidified with nitric acid. After the experiment is finished the precipitated chloride of silver can be determined by weight analysis. Even quantities which are below 0.01% of chlorine in methyl alcohol can be analyzed. For the analysis of sulphur, alkali is placed in the receiver and in this solution, after the oxidation has taken place, the sulphur is analyzed as sulphuric acid.

*Example.*

1 kilogram methyl alcohol of 98.28 per cent by weight produced from waste of lixiviation of sulfite-cellulose pulp which showed a percentage in sulphur of 0.06% was mixed at a temperature of 18° C. with 6 grams of chlorine (equal to about 2 liters of chlorine gas); the mixture was allowed to stand for 12 hours and was distilled in a laboratory-rectifying apparatus. There was obtained:—

53 grams first runnings with 0.007% of chlorine; 900 grams middle runnings of 99.5 per cent by weight of which 30 grams burned in the above described device made silver nitrate solution in the receiver turbid, but only slightly opalescent.

An experiment made with chemically pure alcohol resulted in the same turbidity. Sulfur compounds could not be found even upon burning 30 grams, by any test—not even qualitatively.

It has been proved that in many cases where the process could have been applied with advantage neither chlorine in the gaseous state nor chlorine water could be procured. The only chlorine product which was at disposal was solid, generally chloride of lime. An experiment to utilize such solid chlorine substances for the carrying through of the process failed in the first instance so that means had to be devised to make these chlorine compounds useful for the process in the simplest possible manner. It has been found that the process can be carried through also with the aid of solid chlorine compounds if the chlorine is produced by separation from the solid chlorine compounds in aqueous solution or as slime. Which of the solid chlorine compounds is used for this purpose depends evidently on which chlorine compound is at disposal. In most cases it will be chloride of lime. An emulsion of chloride of lime can for instance be produced which is then supersaturated with hydrochloric acid and this solution is then used in the process as chlorine water.

Claim.

A process for purification of methyl alcohol containing sulphurous impurities, which consists in treating a mixture of substantially equal parts of the crude methyl alcohol and water with a chlorinating agent in the proportion of 7 to 8 parts by weight of active chlorine to one part by weight of sulfur present at ordinary temperatures, permitting the reaction to proceed for about 12 hours, and rectifying the reaction product.

In testimony whereof, I affix my signature.

WILHELM ELSNER.

Witnesses:
  Francis J. Dugan,
  W. Fall.